United States Patent Office 3,511,230
Patented May 12, 1970

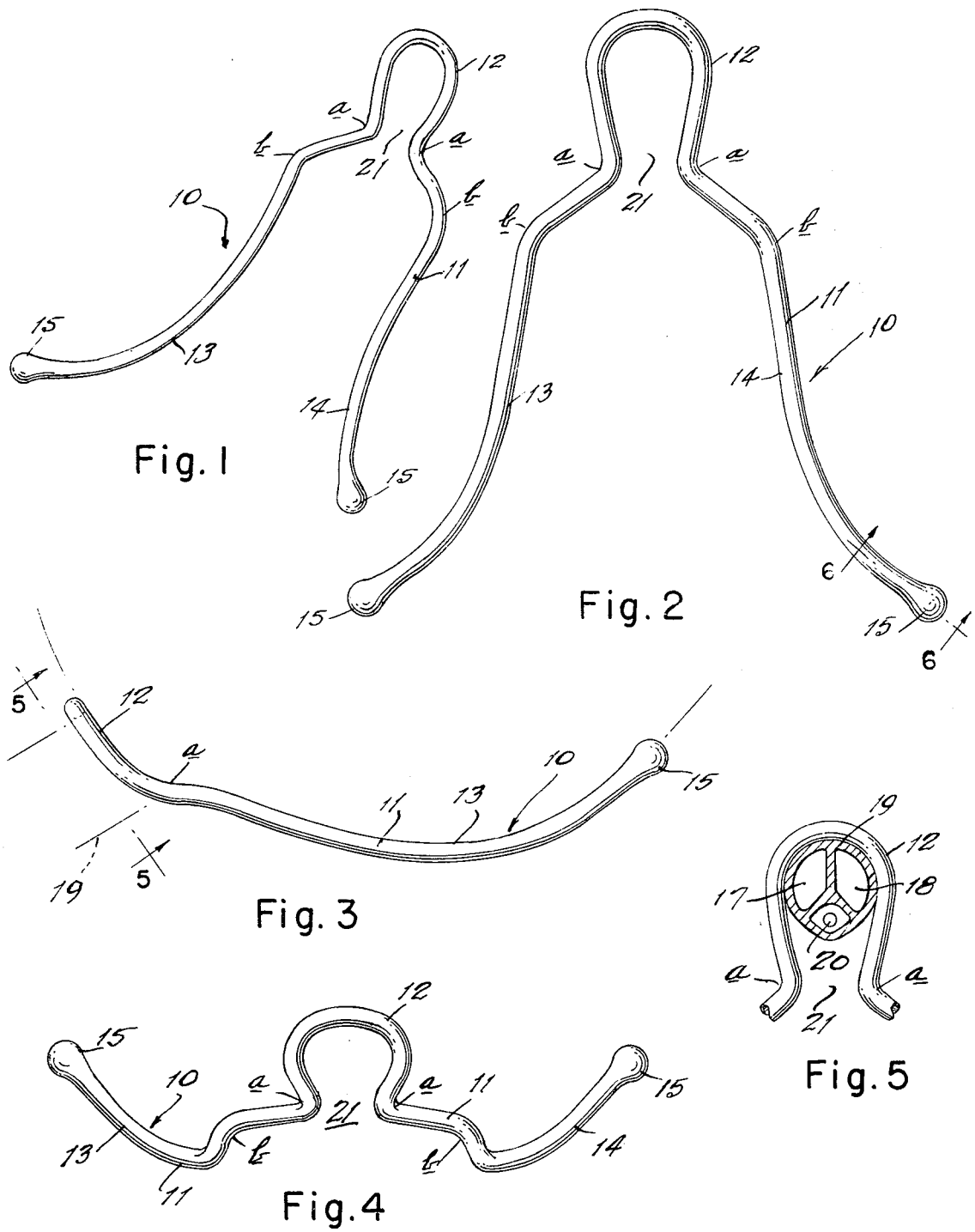

---

3,511,230
COPULATION AID
Paul B. Strong, 6005 Preston Road,
Dallas, Tex. 75205
Filed Apr. 19, 1968, Ser. No. 722,604
Int. Cl. A61h *19/00*
U.S. Cl. 128—79        2 Claims

ABSTRACT OF THE DISCLOSURE

A device for attachment to the male regenerative organ whereby to insure the maintenance of the organ in erection during the copulatory act, or coition, and comprises an integral unit formed of flexible plastic covered wire defining a substantial V-shape, the bifurcations, or legs, curving outwardly toward their termini. At the convergence of the legs is formed a loop by which the organ is embraced, adjacent to its juncture with the body, or the ischio-base end, and by which pressure can be applied thereto when the diverging legs are pressed inwardly, resulting in the constriction of the corpora cavernosa close to the body and prevent the backflow of the accumulation of blood in the erectile tissue during the coition, and without restriction of the urethra.

SUMMARY OF THE INVENTION

This invention relates to sexual copulation aids, and it has particular reference to a device for application to the male organ to maintain erection during intercourse.

A prime object of the invention resides in the provision of a therapeutic device by which genital impotence in the male may be overcome so that the erection of the organ can be maintained to function normally when genital impotence is due either to advanced years, or in younger males where socalled impotency may be psychological.

A further object of the invention is that of providing a device which can, by its use, aid in overcoming either physical or psychological impotence in males and thus avoid many of the unhappy consequences resulting from the inability of the male member of the union to function normally in the coition in marital relations, whether such inability is due to genital infirmity or to some psychological complex.

A still further object of the invention is that of providing an aid in coition in marital relations, when weakness or impotency is evident in the male, which can be safely employed since no portion of the device is applied or used internally of the respective subjects.

Broadly, the invention seeks to provide an aid by which the male is enabled to perform the act of sexual intercourse in a normal manner in marital relations, although physically or psychologically incapacitated, and thus tend to create a satisfactory compatibility between the partners.

While the foregoing objects are paramount, other and lesser objects will become apparent as the description proceeds when considered in connection with the appended drawings wherein:

FIG. 1 is a perspective view of the embodiment of the invention.

FIG. 2 is a plan view thereof.

FIG. 3 is a side elevational view.

FIG. 4 is an end view.

FIG. 5 is a fragmentary illustration of the loop portion of the device, on line 5—5 of FIG. 3, showing the male organ in transverse section as the invention is applied thereto, and FIG. 6 is an enlarged fragmentary illustration of one of the tips of the leg members, on line 6—6 of FIG. 2, and partially in section.

The invention is preferably formed of a flexible wire 10 sheathed in a coating of plastic material 11, or a plastic tube, and generally V-shaped, as best shown in FIGS. 1 and 2, defining an open loop 12 at the juncture of the divergent legs 13 and 14 which are bent outwardly at *a* at the base of the loop 12 to extend at opposite obtuse angles, as shown in FIG. 2, and bent at *b* to narrow the divergence at this point, and are then curved outwardly and upwardly, as apparent in FIGS. 1, 2, 3 and 4, terminating in bulbous tips 15, shown fragmentarily, and partially in section, in FIG. 6, which cover the ends 16 of the wire members 13 and 14.

OPERATION

In FIG. 5 is shown a sectional view of the male organ wherein the cells 17 and 18 represent the corpora carvernosa through which the blood flows to stimulate and effect an erection of the penis 19. The uretha 20 is also indicated.

The device, in operation, is applied by arranging the loop 12, which is open at the bottom at 21, over the penis at the juncture thereof with the body (not shown) or as indicated in FIG. 3, the loop 12 being capable of contraction on the organ, by pressure applied to the legs 13 and 14 which, in the applied position of the invention, extend between the legs of the wearer at the crotch and on each side of the scrotum (not shown) which will depend between the leg members 13 and 14 and out of contact therewith. The desired pressure can be applied to the organ 19, and maintained, by the drawing together of the legs 13 and 14, the manipulation being accomplished by the wearer.

It is to be noted that the invention can be worn and manipulated without constriction of the urethra 20 while restraining the backflow of the blood coursing into the corpora cavernosa circulatory system 17 and 18, the presence of which normally causes the erection of the organ 19. The recession of the blood from the system causes the organ to relax, or become limp, so as to be incapable of completing the coition.

It has been established by professional authority that as long as the blood supply to the corpora cavernosa system is maintained in the penis 19, the organ will remain erected so as to complete the coition in a normal manner. It has also been shown that the invention cannot be injurious to either the wearer or to his female partner. A gentle pressure at the ischio-base of the organ 19 will accomplish the desired result without undue restriction of the normal functions thereof.

The invention, while being described in substantial detail, is capable of certain changes and modifications in structure and design without departing from the spirit and intent thereof or the scope of the appended claims.

What is claimed is:

1. In a copulation aid for attachment to the male regenerative organ for maintaining erection during coition, a unitary plastic coated wire structure, substantially V-shaped in form, having a pair of diverging leg members and an open loop formed at the convergence of the leg members, the said leg members being bent outwardly at said loop at obtuse angles, then inwardly but maintaining a slight outward angulation, and curving outwardly toward their outer ends, both legs being also curved longitudinally in one direction in the same plane, whereby said loop can engage the organ adjacent the body of the wearer and be manipulated to exert pressure on said organ.

2. In a device as described in claim 1, the said loop being yieldable and capable of being flexed inwardly by the said legs.

References Cited

FOREIGN PATENTS 98,024    9/1924    Austria.
547,535    9/1942    Great Britain.

LAWRENCE W. TRAPP, Primary Examiner